M. C. & A. H. SMITH.
HAY ELEVATOR AND CARRIER.
No. 174,446. Patented March 7, 1876.
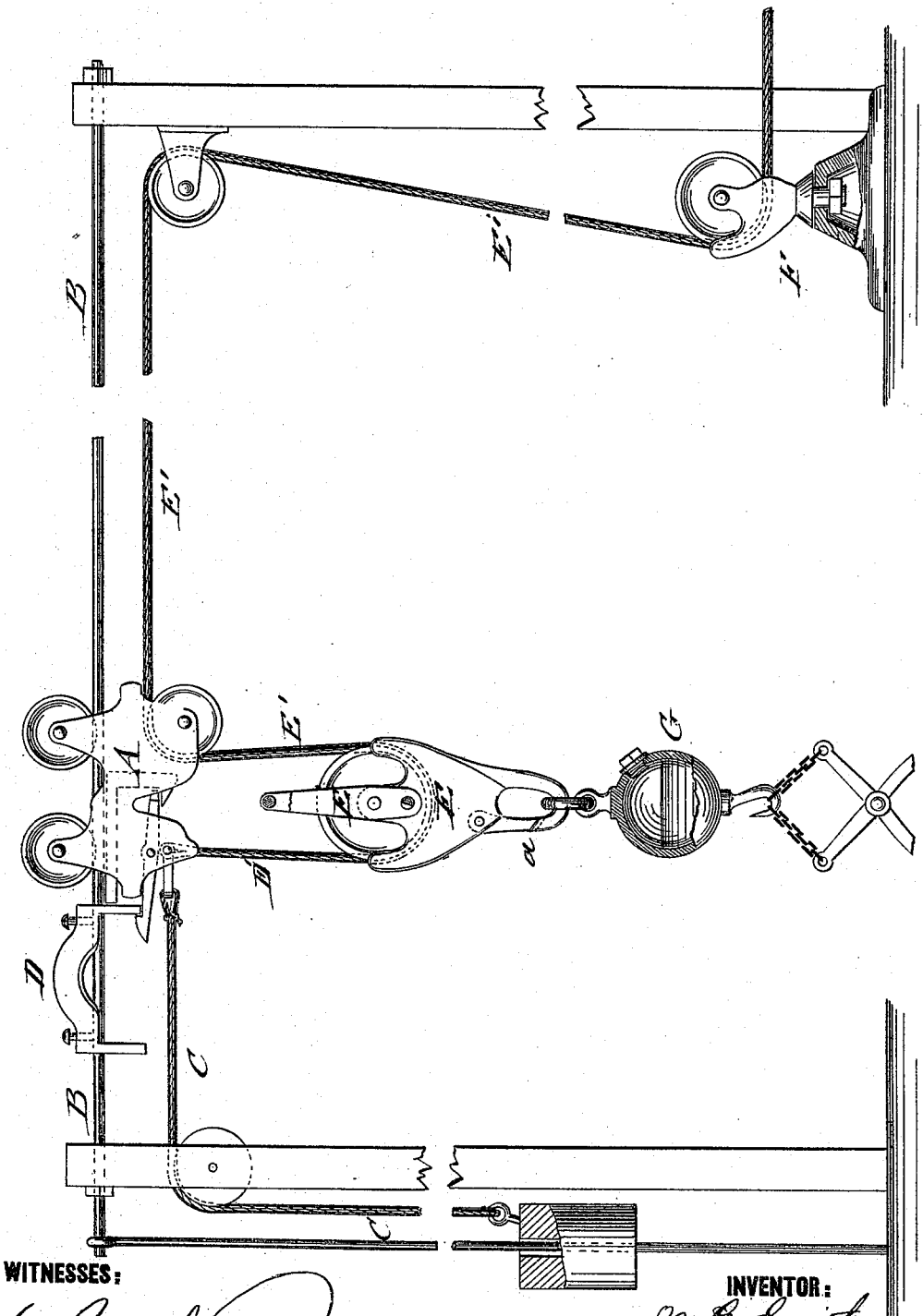
WITNESSES:
Chas. Nida
John Goethals
INVENTOR:
M. C. Smith
A. H. Smith
BY
ATTORNEYS.

UNITED STATES PATENT OFFICE.

MOSES C. SMITH AND ABRAM H. SMITH, OF STARKVILLE, NEW YORK.

IMPROVEMENT IN HAY ELEVATORS AND CARRIERS.

Specification forming part of Letters Patent No. 174,446, dated March 7, 1876; application filed January 22, 1876.

*To all whom it may concern:*

Be it known that we, MOSES C. SMITH and ABRAM H. SMITH, of Starkville, in the county of Herkimer and State of New York, have invented a new and Improved Hay Elevator and Carrier, of which the following is a specification.

The accompanying drawing represents a side elevation, partly in section, of our improved hay elevator and carrier.

Our invention relates to an improved elevator and carrier for hay and other articles that may be reliably worked at any part without interruption and charged with the load at any required point.

The invention consists in attaching one end of lifting-rope to carriage, passing it then under load-carrying pulley, thence over a guide-pulley on the carriage, as well as one on the frame, and finally under a grooved pulley journaled in a swiveled frame. It also consists in using a variable balance-weight with the load-carrying pulley.

The load-carrying pulley is hung to the carriage, raised and lowered by a rope and swivel-pulley, and moved forward to the contact-stop by a cord and weight applied to the carriage. An adjustably-weighted ball hung to the fork-carrying pulley balances the length of rope by which the load is raised and lowered.

In the drawing, A represents a movable carriage, made of any approved construction, and running by top wheels on a strong track-rod, B, supported in any suitable manner in the barn or other place where the hay or other article has to be stored. The carriage A is moved along the supporting-rod by a rope, C, that passes over a pulley, and is supported sufficiently to produce the ready motion of the carriage in one direction, until the same comes in contact with a stop-frame, D, that may be adjusted by clamp-screws to any point along rod B, so as to admit the taking up of the load at any suitable point on the rod B.

The carriage is so constructed that the arrow or bail of a load-carrying pulley, E, is locked thereto after being elevated, and released by the contact with the stop-frame. The load-carrying pulley E is hung to the carriage by a rope, E', which is applied to a fixed point of the carriage A, and passes over a pulley of the same to the end of the supporting rod, then over a second pulley to the ground, and over a swivel-pulley, F, to the draft-bar of the horse or other power. The swivel-pulley has the advantage of adjusting itself readily to the direction of strain without clamping or wedging the hoisting and lowering rope E'.

The load-carrying pulley E turns in a block that is closed at the lower part and provided with a fixed snap-hook, *a,* to which the hay-fork or other load-carrying device is not directly hung, but to an intermediate weight, G, for the purpose of balancing the length of draft-rope E'. A bottom hook of weight G carries the hay-fork or load.

The weight G is capable of being adjusted to the varying length of draft-rope by being made in the shape of a hollow ball, that is filled with the required quantity of shot. It has the advantage of accelerating the carrying back of the fork-pulley on the supporting-rod, and of preventing any twisting or entangling of the draft-rope, so as to interfere with the regular and exact working of the locking and releasing mechanism of the carriage.

The stop-frame is set to the different points on the rods at which the load is to be taken up, and causes the lowering of the weighted pulley at the moment of contact of the carriage with the same. The weighted pulley is then loaded and raised again, releasing the carriage from the stop-frame and locking thereto, being then ready to be drawn toward the place of storage, when the load is dropped by a cord-connection to the fork in the customary manner. The return of the rope is secured by the weighted cord attached to the carriage. Thus a reliable and efficiently working elevating and carrying apparatus for hay and other articles is obtained.

Having thus described our invention, we claim as new and desire to secure by Letters Patent—

1. The combination, with the lifting-rope E', attached at one end to front of carriage A, of the load-carrying pulley, the ground-pulley, swiveled as described, and two intermediate pulleys, one on the carriage and the other on the frame, all arranged as and for the purpose specified.

2. The combination, with the load-carrying pulley, of a variable weight for balancing the draft-rope, substantially for the purpose set forth.

MOSES C. SMITH.
ABRAM H. SMITH.

Witnesses:
PAUL GOEPEL,
T. B. MOSHER.